(12) United States Patent
Marsolek et al.

(10) Patent No.: US 8,096,379 B2
(45) Date of Patent: Jan. 17, 2012

(54) FORCE ASSIST ARRANGEMENT FOR A SLIDABLE COUPLING

(75) Inventors: John L. Marsolek, Watertown, MN (US); Ryan J. Nelson, Maple Grove, MN (US); Mike P. Siers, Plymouth, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 526 days.

(21) Appl. No.: 12/113,766

(22) Filed: May 1, 2008

(65) Prior Publication Data
US 2009/0272591 A1 Nov. 5, 2009

(51) Int. Cl.
*B62D 25/24* (2006.01)

(52) U.S. Cl. ............. 180/69.24; 180/89.17; 296/193.11; 49/359

(58) Field of Classification Search ................. 180/69.2, 180/69.21, 69.24, 89.17, 89.18; 296/193.11, 296/193.12; 49/158, 159, 345, 346, 356, 49/358, 359, 360, 413, 414, 420, 421, 424, 49/453
See application file for complete search history.

(56) References Cited

U.S. PATENT DOCUMENTS

| | | | |
|---|---|---|---|
| 1,292,437 A * | 1/1919 | Critchlow | 49/159 |
| 1,632,700 A * | 6/1927 | Fairley | 49/155 |
| 2,837,372 A | 6/1958 | Odom | |
| 3,394,772 A | 7/1968 | Abold | |
| 3,487,887 A | 1/1970 | Pensa | |
| 3,561,161 A * | 2/1971 | Green | 49/359 |
| 3,754,614 A | 8/1973 | Habas | |
| 3,765,500 A | 10/1973 | Reeves | |
| 4,270,623 A | 6/1981 | Brandl et al. | |
| 4,359,119 A | 11/1982 | Kammerman | |
| 5,564,514 A | 10/1996 | Knight | |
| 5,681,074 A | 10/1997 | Christensen | |
| 5,803,198 A | 9/1998 | Baxter et al. | |
| 5,975,228 A | 11/1999 | Parfitt | |
| 6,213,235 B1 | 4/2001 | Elhardt et al. | |
| 6,311,796 B1 | 11/2001 | Mayer | |
| 6,343,828 B1 * | 2/2002 | Young et al. | 296/100.1 |
| 6,641,201 B1 | 11/2003 | Pietryga et al. | |
| 6,953,220 B2 | 10/2005 | Takehara | |
| 7,137,174 B2 * | 11/2006 | Derbis et al. | 16/289 |
| 7,232,178 B2 | 6/2007 | Neal et al. | |
| 7,766,419 B2 * | 8/2010 | Krolnik et al. | 296/193.11 |
| 2005/0264029 A1 * | 12/2005 | Bodner | 296/146.8 |

FOREIGN PATENT DOCUMENTS

| JP | 62-214013 A | 9/1987 |
|---|---|---|
| JP | 2006290121 | 10/2006 |

* cited by examiner

*Primary Examiner* — John Walters
(74) *Attorney, Agent, or Firm* — Leydig, Voit & Mayer (57) ABSTRACT

The disclosure includes a force assist arrangement for a slidable coupling, a slidable coupling including the force assist arrangement, and a machine including respectively slidable portions, such as, the slidable coupling, and the force assist arrangement. The force assist arrangement includes at least first and second links pivotably coupled together at one end and to the respectively slidable portions at the other ends, and a force assist device pivotably coupled to the links along their respective lengths.

19 Claims, 13 Drawing Sheets

FORCE ASSIST ARRANGEMENT FOR A SLIDABLE COUPLING

TECHNICAL FIELD

This patent disclosure relates generally to force assist arrangements for a slidable coupling, more particularly to a force assist arrangement for first and second portions slidably coupled relative to one another.

BACKGROUND

Many structures include sections that are slidably coupled relative to one another, as, for example, machines that include panels that are slidably mounted relative to an opening to allow access to the opening. Such portions or panels are often heavy and cumbersome, however, and cannot be moved without considerable human effort. As a result, mechanical force assist arrangements are often utilized to assist operators in moving machine panels between open and closed positions. Such force assist arrangements may be integral arrangements coupled to the machine itself, or separate machines that are temporarily coupled to the panel to supply the necessary force assist. Arrangements that are directly coupled to the machine, such as complex spring or linkage arrangements, often present challenges in view of packaging considerations and/or sealing requirements. The utilization of separate arrangements, such as a crane, lift, or the like, however, not only involves additional investment, but may not be readily available when required.

Panel coupling arrangements typically operate to pivot, swing, or slide a panel, or a combination of such movements. Integral force assist devices utilized with such panel coupling arrangements are generally designed to assist an operator in moving a panel in a pivoted or swinging motion. Due to space constraints, efficiency considerations, ease of use, and space and other restrictions, however, a swinging motion may not always be the most preferable motion. For example, in vehicles including engine cooling systems, the inclusion of swinging or pivoting panels may result in undesirable openings for warm air to reenter or exit the machine.

U.S. Pat. No. 6,641,201 to Brad L. Pietryga et al. (the '201 patent) discloses a convertible bed cover for a vehicle. Pietryga includes both a pivoting motion of the bed cover panel to lift the end aft the vehicle, and a sliding motion to cause rollers at the forward end of the panel to roll within tracks to slide the panel up and over the top of the truck cab. The pivoting motion is assisted by gas springs, while the sliding motion is assisted by a cable assist arrangement. The cable assist arrangement, however, is a relatively complex structure that includes numerous moving parts and opportunities for component failure.

It is therefore desirable to provide a force assist device for use with a slidable coupling in order to reduce the amount of force required to move slidable portions relative to one another. Such an arrangement preferably would be space efficient, and may be connected to a panel allowing the panel to move in a sliding motion. The present disclosure is directed to overcoming one or more of the shortcomings of the art set forth above.

SUMMARY

The disclosure describes, in one aspect, a force assist arrangement adapted to be coupled to a first portion and a second portion, the two portions being slidably coupled relative to one another. The force assist arrangement includes an assist device and at least a first link and a second link. The links are pivotably coupled together at their first ends and the second end of the first link is pivotably coupled to the first portion while the second end of the second link is pivotably coupled to the second portion. The assist device is pivotably coupled along the lengths of the first and second links.

The disclosure describes, in another aspect, an assembly for attachment to first and second portions to be mounted in a relatively slidable arrangement. The assembly comprises a slidable coupling adapted to be coupled to at least one of the first and second portions to provide sliding movement therebetween, and a force assist arrangement. The force assist arrangement includes an assist device and at least a first link and a second link. Each link has a length and first and second ends. The links are pivotably coupled together at their first ends, the second ends of the first and second links are pivotably coupled to the first portion and second portions, respectively. The assist device is pivotably coupled along the respective lengths of the first and second links.

The disclosure describes in yet another aspect, an assembly comprising a body with an opening, a panel that is complementary to opening, and a force assist arrangement. The complementary panel is adapted to slide with respect to the body between a first position wherein the opening is at least partially uncovered and a second position wherein the opening is at least partially covered by the panel. The force assist arrangement includes at least a first link and a second link, with the links being pivotably coupled together at their first ends. The second ends of the first and second links are pivotably coupled to the body and the panel, respectively. The assist device is pivotably coupled along the respective lengths of the first and second links.

The disclosure further describes, in another aspect, a method of assisting sliding movement between first and second portions, the method including the steps of slidably coupling first and second portions, and coupling a force assist arrangement to the first and second portions. The step of coupling a force assist arrangement includes the steps of pivotably coupling at least a first link to the first portion, pivotably coupling a second link to the second portion, pivotably coupling the first link and the second link together, and pivotably coupling an assist device along the respective lengths of the first and second links.

DETAILED DESCRIPTION

This disclosure relates to a force assist arrangement for a slidable coupling. The force assist arrangement may reduce the amount of force required to slidably move at least two portions relative to one another, such as, for example, as with a panel that is slidably mounted adjacent an opening into a compartment, such as an engine compartment or a trunk. The force assist arrangement may provide additional advantages, at least some of which will be apparent from the following disclosure.

Referring to the drawings, first and second structures or portions 100, 102 are slidably coupled relative to one another by way of a slidable coupling 104. The portions 100, 102 may be any structures that are slidably mounted relative to one another. By way of example only, the portions 100, 102 may be a panel 106 disposed to slide between closed and open positions 108, 110 (see FIGS. 7 and 8, respectively) covering an opening 112 to an engine compartment 114 of a vehicle 116. By way of further example, the slidably coupled portions may be a slidable panel and a stationary machine or building.

The slidable coupling 104 may be of any appropriate design. In the illustrated embodiment of FIGS. 1-5, first and second portions 100, 102 are slidably coupled together using a pair of linear bearings 118, 120 that each include a channel 122 adapted to receive at least one longitudinal member 124. The longitudinal member 124 is coupled to the first portion 100, while the linear bearings 118, 120 are coupled to second portion 102. In use, the longitudinal member 124 slides within the channels 122 of the linear bearings 118, 120 to allow the first and second portions 100, 102 to slide relative to one another. It will be appreciated that a single linear bearing or a greater number of linear bearings may be provided, so long as the relative sliding movement is as stable as desired.

Figure 1:
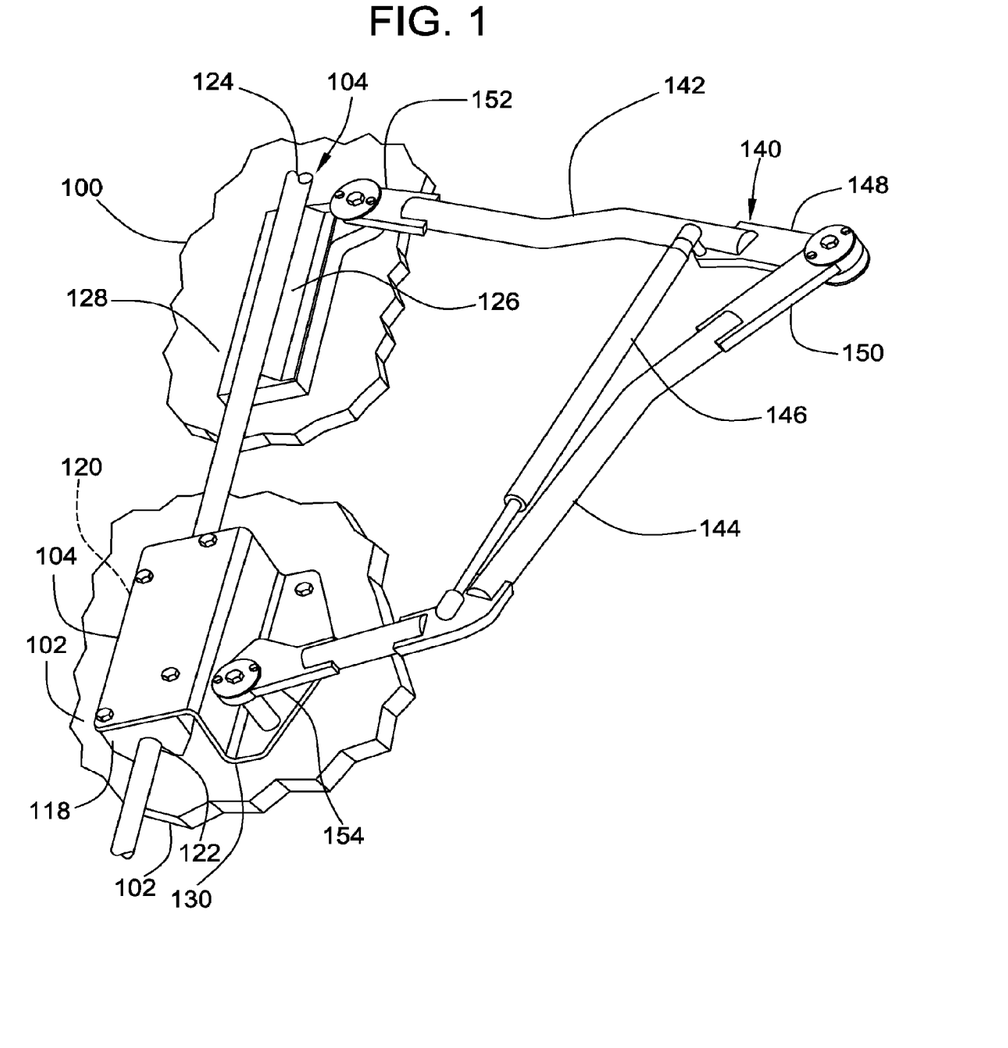
FIG. 1 is an isometric view of an exemplary slidable coupling and force assist arrangement embodying the disclosure.
Figure 2:
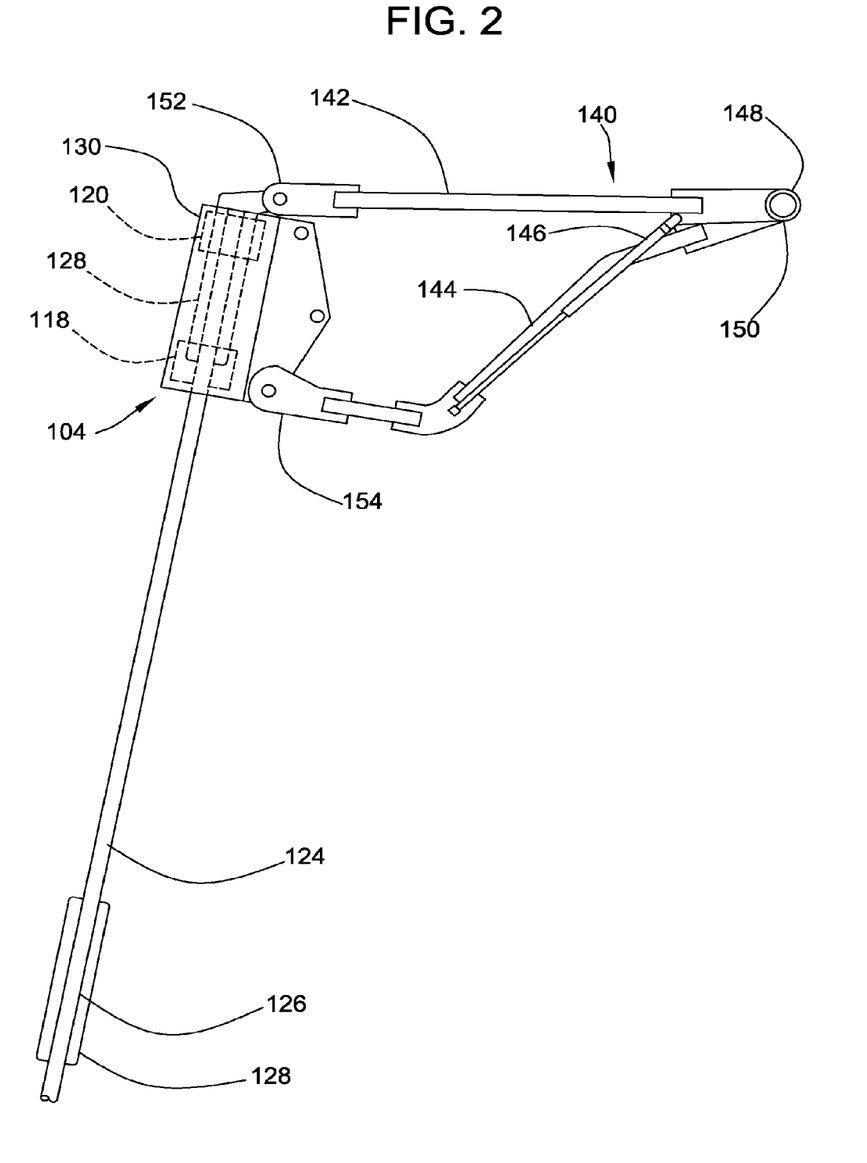
FIG. 2 is a fragmentary side view of the exemplary slidable coupling and force assist arrangement of FIG. 1 in a first position
Figure 3:
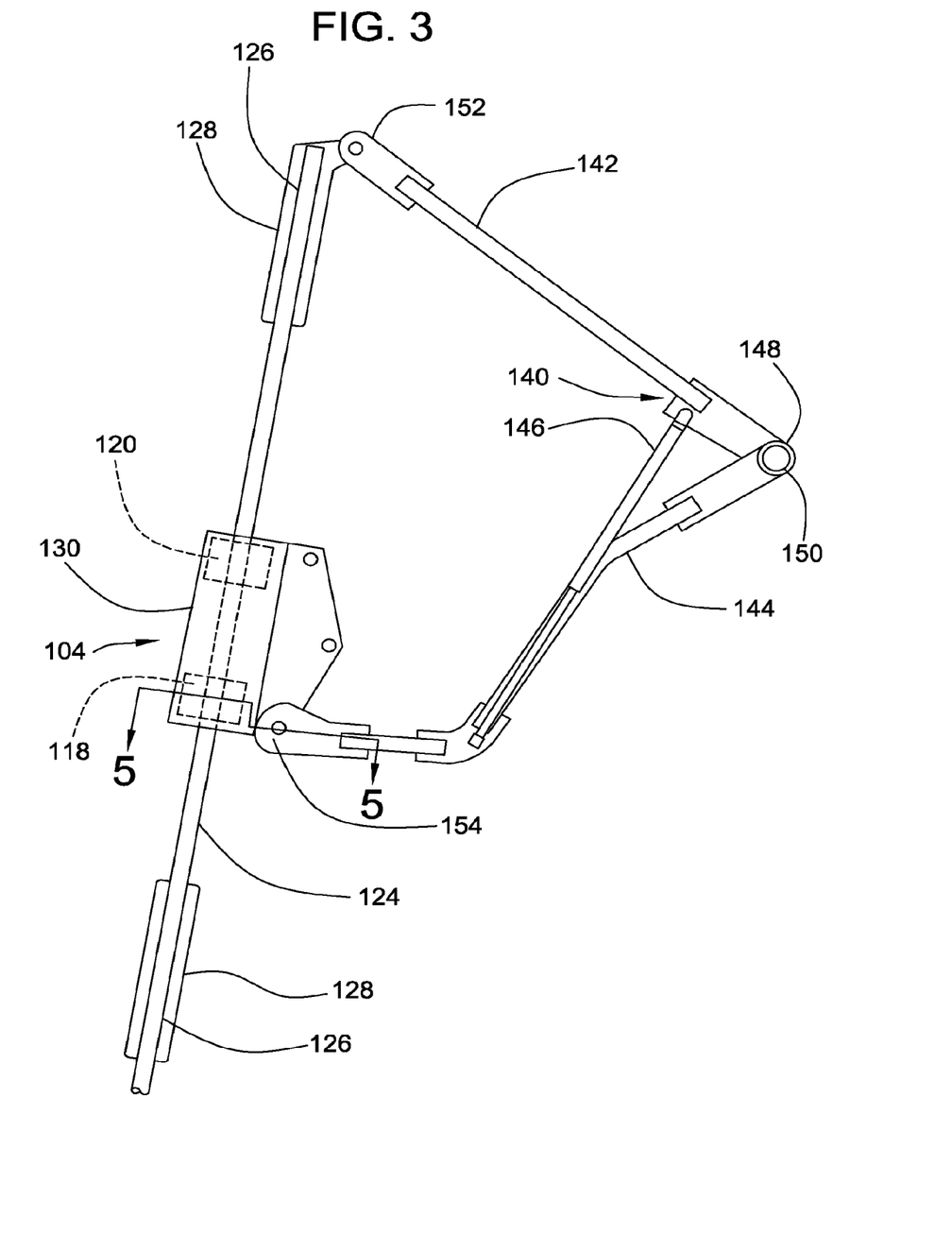
FIG. 3 is a fragmentary side view of the exemplary slidable coupling and force assist arrangement of FIGS. 1-2 in an intermediate position.
Figure 4:
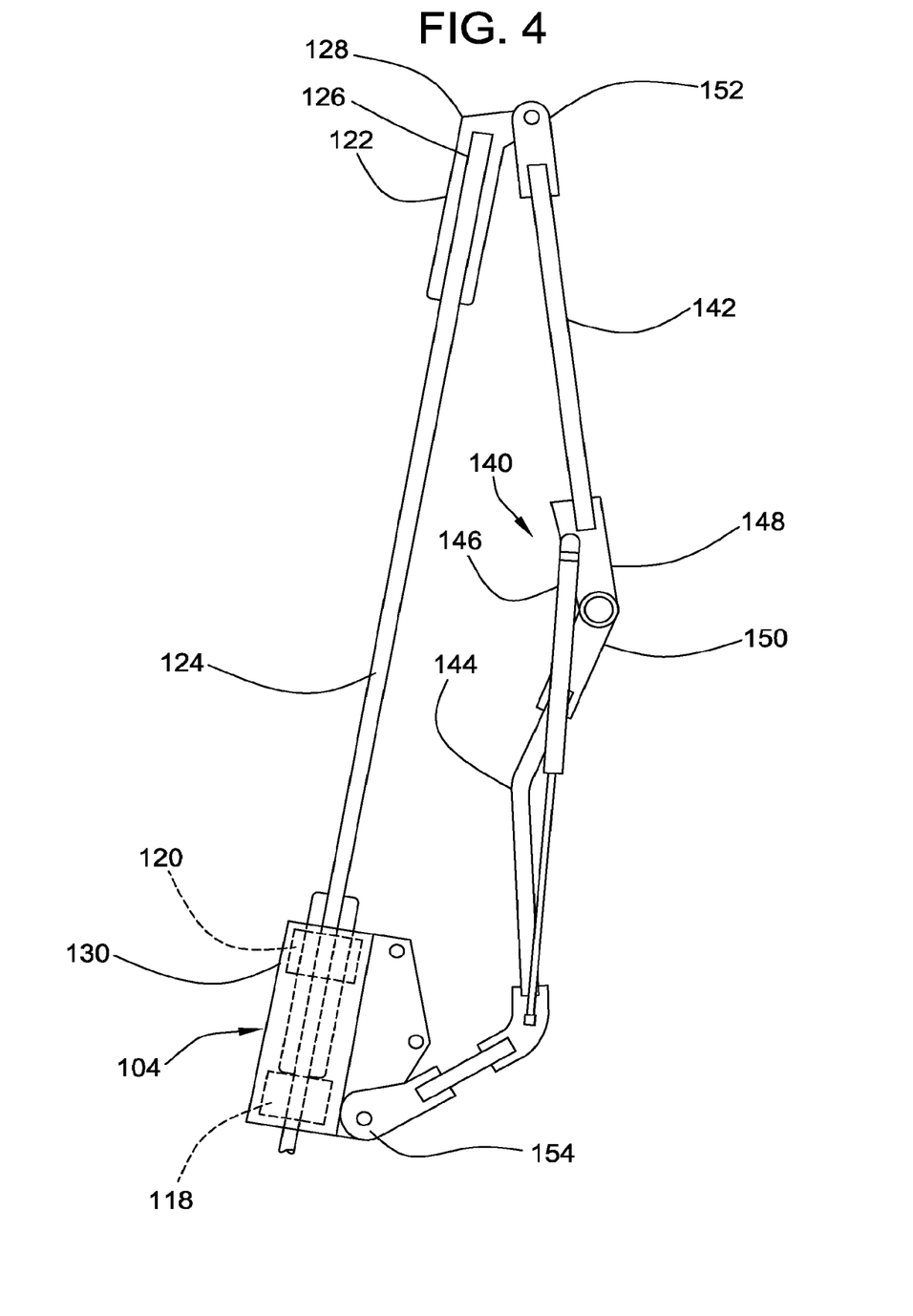
FIG. 4 is a fragmentary side view of the exemplary slidable coupling and force assist arrangement of FIGS. 1-3 in a second position.
Figure 5:
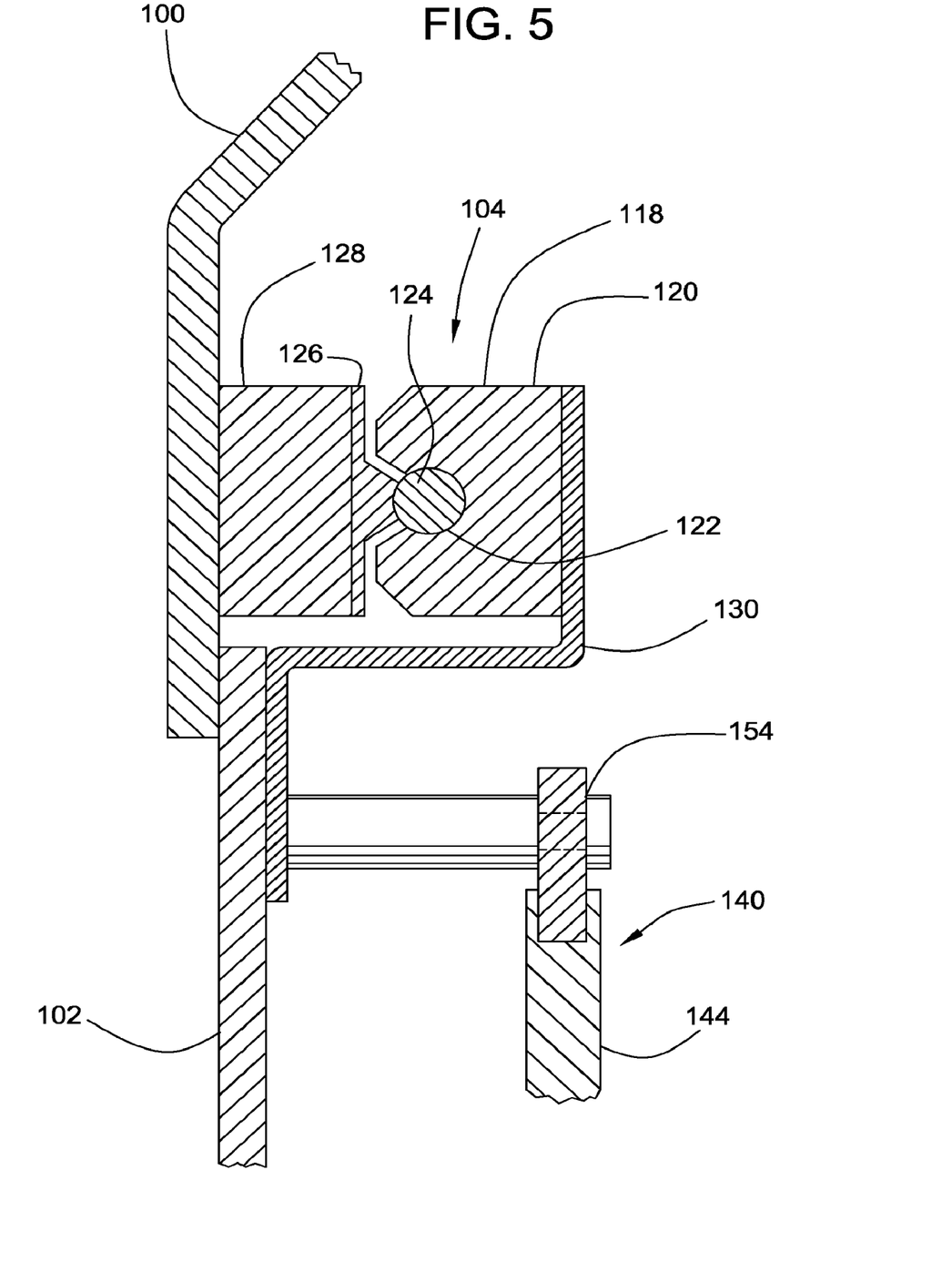
FIG. 5 is a fragmentary, cross-sectional axial view of exemplary slidable coupling and force assist arrangement taken along line 5-5 in FIG. 3.

The longitudinal member 124 and linear bearings 118, 120 may be of any appropriate design, so long as the outer surface is received and contained within the complimentary channels 122 within the linear bearings 118, 120. The slidable coupling 104 may be coupled to the first and second portions 100, 102 in any appropriate manner, so long as the components of the slidable coupling 104 are able to provide relative sliding motion between the first and second portions 100, 102 for the desired range of movement. In the embodiment of FIGS. 1-5, the longitudinal member 124 is supported by a plurality of brackets 126 on a plurality of mounting plates 128, and further on a surface of the first portion 100. It will be noted that only one of the mounting brackets 126 is shown in FIG. 1, while a plurality of such brackets 126 is shown in FIGS. 2-4. The linear bearings 118, 120 are mounted to the second portion 102 by a bracket 130. For the purposes of the description of this embodiment, the first and second portions 100, 102 have been defined as the surfaces to which the mounting brackets are attached. It will be appreciated, however, that the first and second portions 100, 102 may alternately be defined as the brackets themselves or any other structure wherein the first portion and the second portions are slidable relative to one another. For example, the first portion 100 could be a vehicle panel or machine panel, and the second portion 102 could be a vehicle body or machine body wherein the vehicle or machine panel is slidable relative to the vehicle or machine body. Further, although the term "coupled" may be utilized herein to describe the relationship of the slidable coupling 104 to the first and second portions 100, the term is not intended to limit the structure to a separate slidable coupling 104 that may then be assembled to the first and second portions 100, 102. Rather, the term "coupled" is intended to cover any such arrangement that is or may be ultimately removably or permanently secured with the first and second portions 100, 102, whether or not any component of the slidable coupling 104 is integrally formed in whole or in part with the first and/or the second portion 100, 102.

Figure 6:
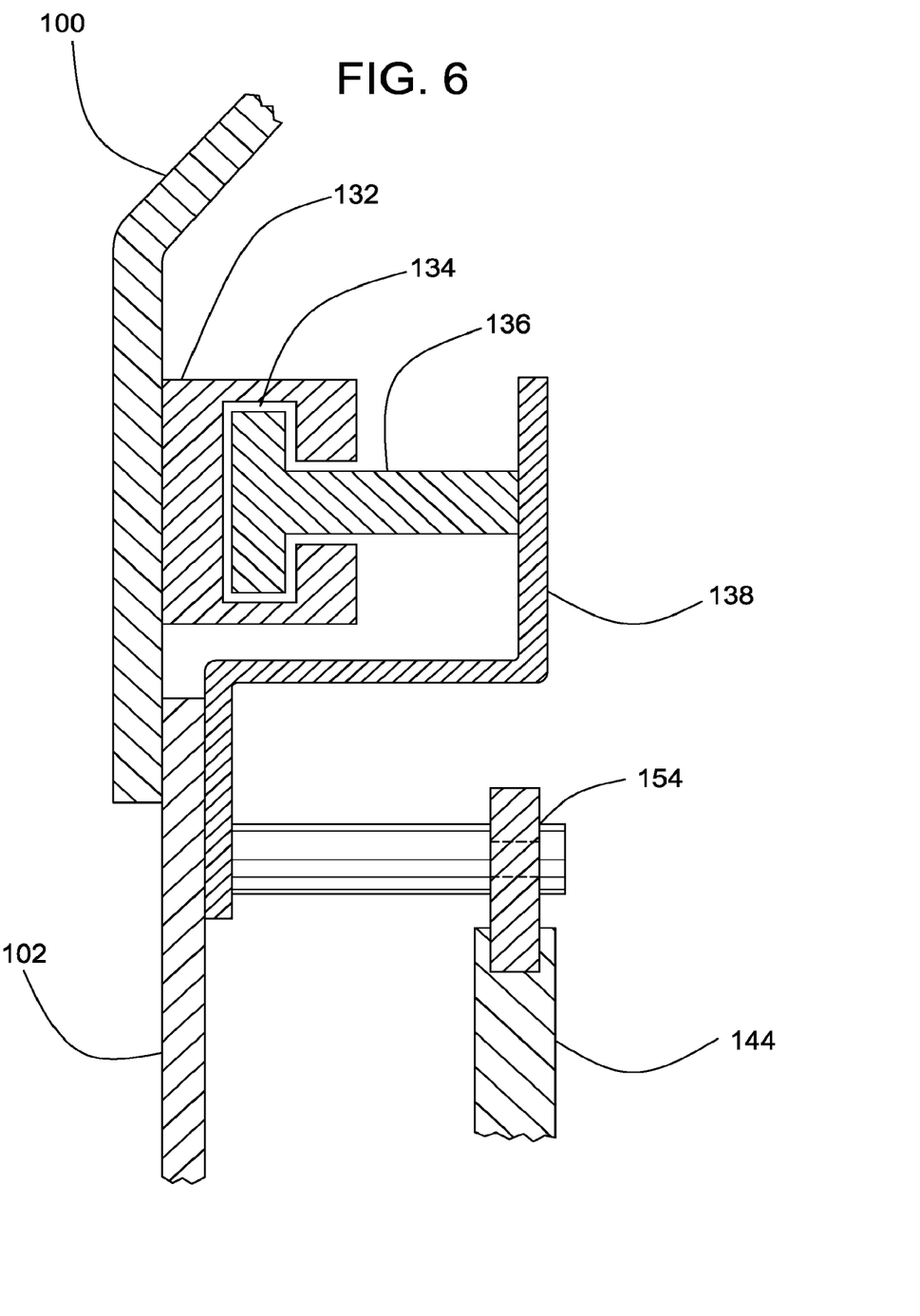
FIG. 6 is a fragmentary, cross-sectional axial view of another embodiment of an exemplary slidable coupling and force assist arrangement embodying the disclosure.
Figure 9:
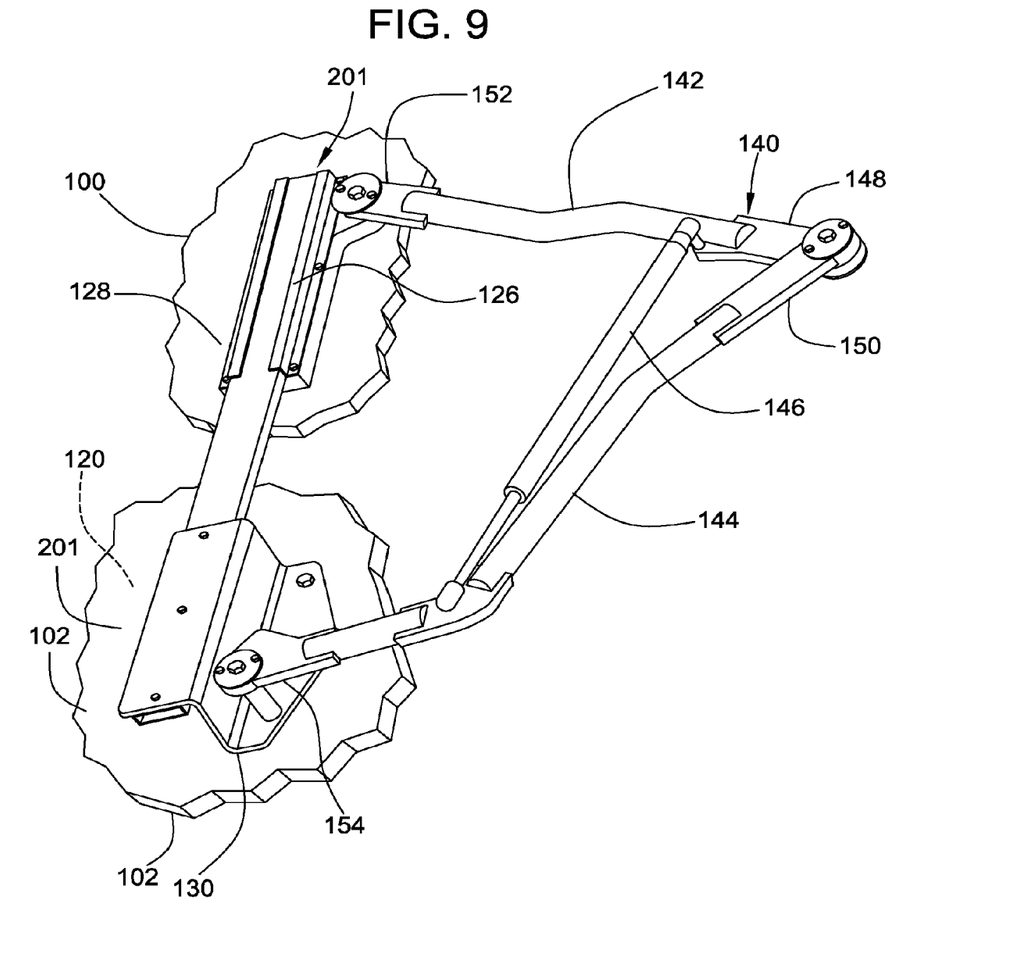
FIG. 9 is an isometric view of an exemplary alternative embodiment of the slidable coupling and force assist arrangement embodying the disclosure.
Figure 10:
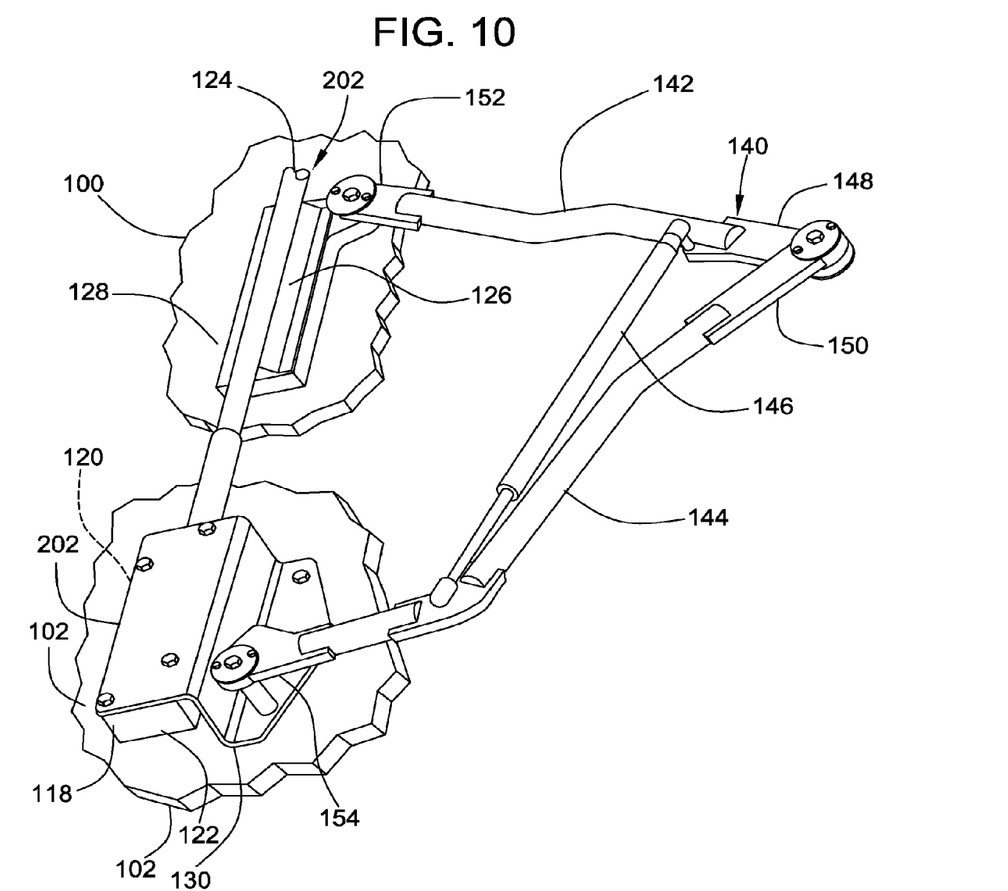
FIG. 10 is an isometric view of an exemplary alternative embodiment of the slidable coupling and force assist arrangement embodying the disclosure.
Figure 11:
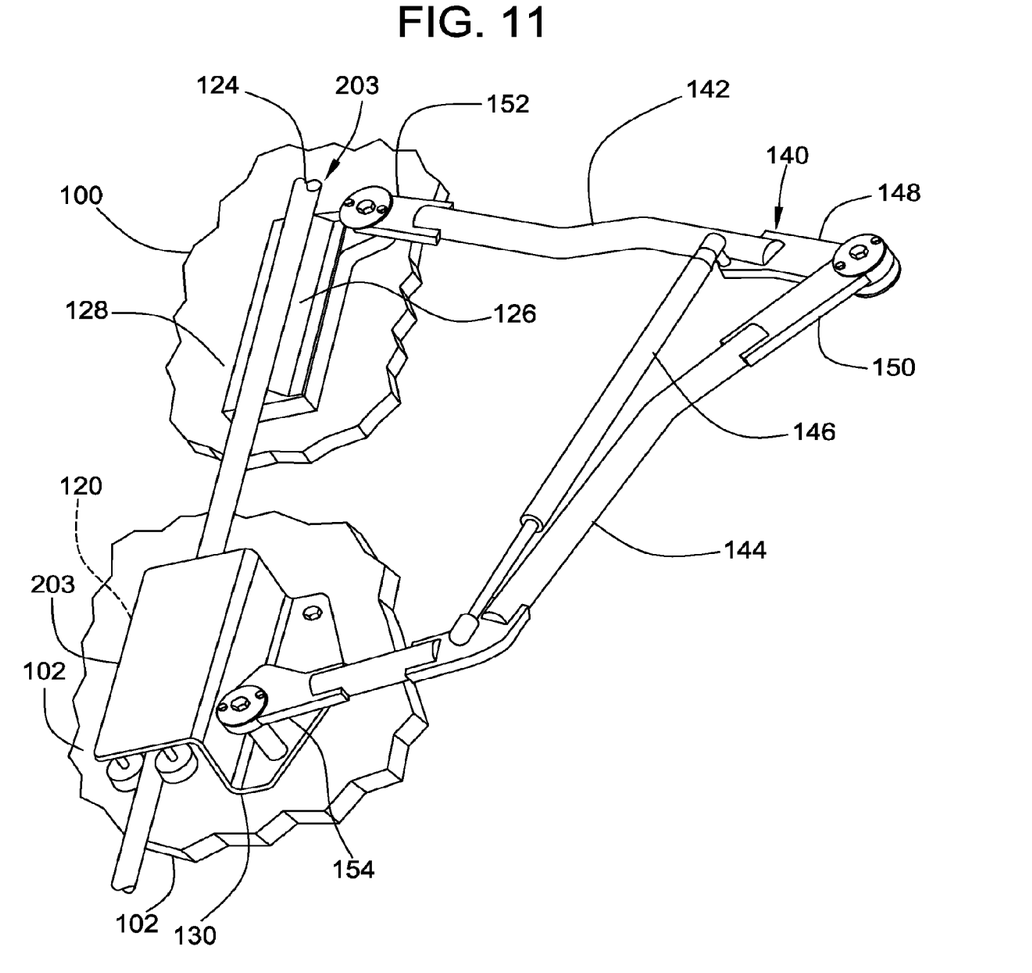
FIG. 11 is an isometric view of an exemplary alternative embodiment of the slidable coupling and force assist arrangement embodying the disclosure.

Alternate arrangements of a slidable coupling 104 may be utilized to provide sliding movement between the first and second portions 100, 102. By way of example only, so-called drawer slides 201 (FIG. 9), telescoping slides 202 (FIG. 10), and one or more tracks and rollers 203 (FIG. 11), or the like may be utilized. By way of further example, the slidable coupling of the embodiment of FIG. 6 includes a track 132 including a channel 134 which receives a T-shaped elongated member 136 supported by a bracket 138. In this way, the elongated member 136 slides within the channel 134 to provide a sliding movement between the first and second portions 100, 102. Moreover, while the embodiment of FIGS. 1-5 illustrates a linear slidable coupling 104, a slidable coupling according to the disclosure need not be limited to a linear motion. Rather, it may provide any appropriate motion, such as, for example, an arcuate sliding motion or a combination of linear or arcuate motions.

Returning to FIGS. 1-5, the disclosed embodiment further includes a force assist arrangement 140 for utilization with the slidable coupling 104. The force assist arrangement 140 includes at least a pair of pivotably coupled links 142, 144 and a force assist device 146 extending therebetween. The links 142, 144 are pivotably coupled to one another at one end 148, 150, and to first and second portions 100, 102 at the other, "free" ends 152, 154. In this way, the force assist device 146 controls and assists the relative movement between the links 142, 144 as they pivot toward and away from one another.

The first and second links 142, 144 may be connected to each other and the first and second portions 100, 102 by any means, so long as the links 142, 144 may pivot between a position in which the free ends 152, 154 of the links 142, 144 are relatively close to one another (See FIG. 2) and a position in which the free ends 152, 154 are separated by a greater distance (See FIG. 4). The separation between the free ends 152, 154 of the links 142, 144 will be dependent upon the sliding distance of the first and second portions 100, 102.

The links 142, 144 may be coupled to each other and to the first and second portions 100, 102 either directly, or by way of additional couplings. In the illustrated embodiment, the links 142, 144 are coupled to the mounting brackets 128, 130 of the slidable coupling 104. In this way, the entire structure, including the slidable coupling 104 and the force assist arrangement 140 may be simultaneously coupled to the first and second portions 100, 102.

The links themselves may be structured to accommodate the space or environment in which they are required to operate. For example, the links 142, 144 may be curved or bent as shown in FIGS. 1-4, or they may be substantially straight. Moreover, the links may be of a unitary or multipart construction, as are the links 142, 144 of the illustrated embodiment of FIGS. 1-4. If either of the links are constructed using multiple pieces the pieces may be connected by any means such as, for example, welds, nuts and bolts, screws, adhesive, and the like.

Figure 12:
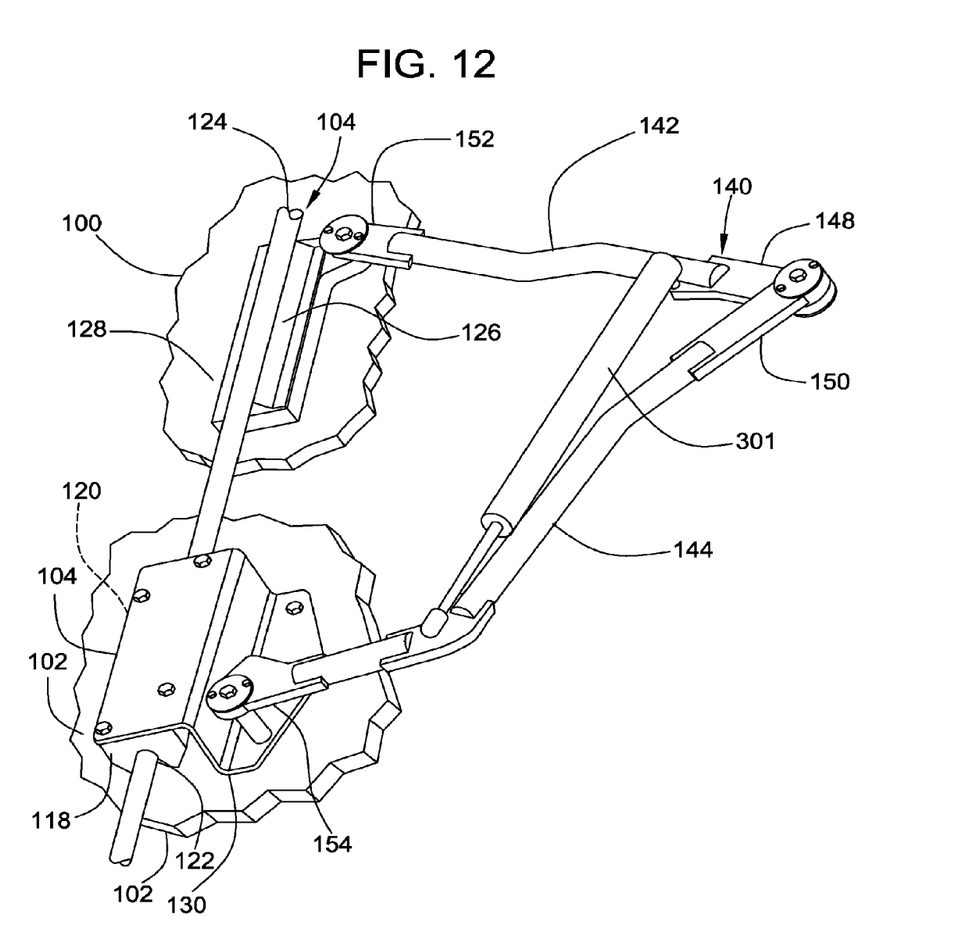
FIG. 12 is an isometric view of an exemplary alternative embodiment of the slidable coupling and force assist arrangement embodying the disclosure.
Figure 13:
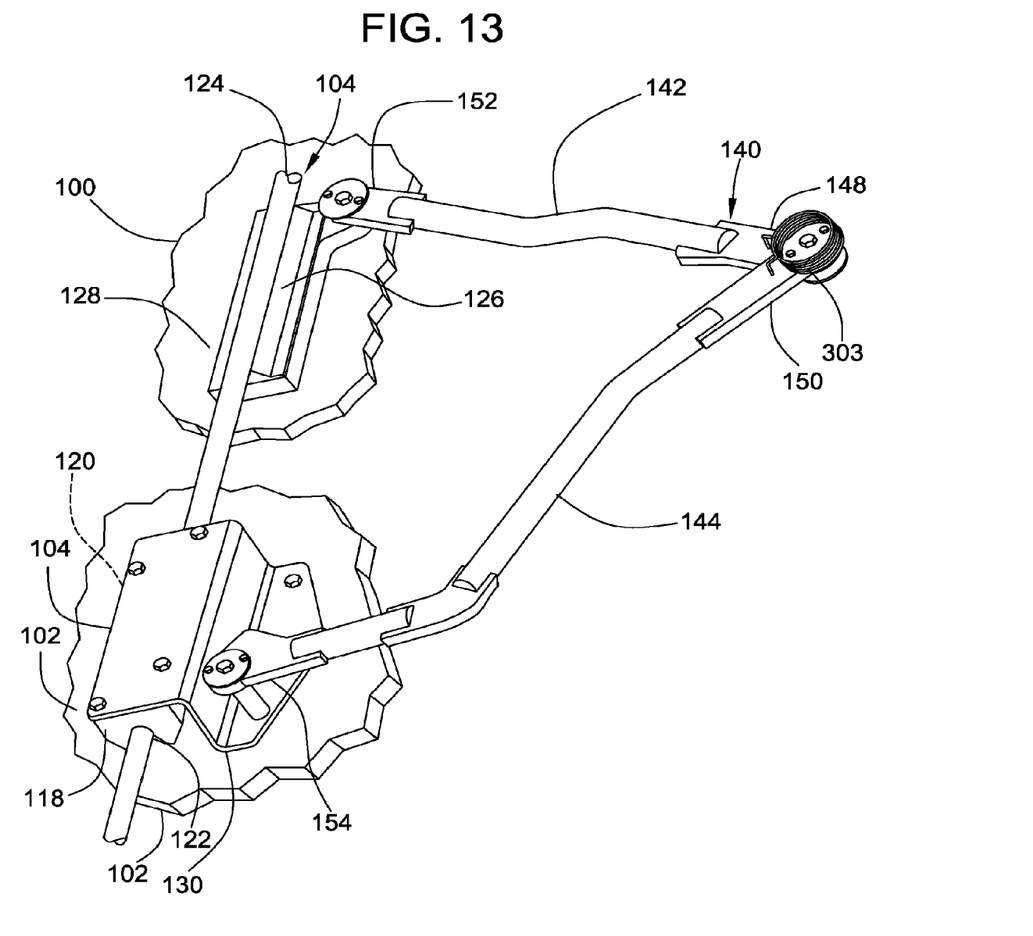
FIG. 13 is an isometric view of an exemplary alternative embodiment of the slidable coupling and force assist arrangement embodying the disclosure.

The force assist device 146 is pivotably mounted along the lengths of the first and second links 142, 144 to control the movement therebetween. While the force assist device 114 is shown as a gas spring, the force assist device 146 may be of an alternate design, such as, for example, a compression spring 301 (FIG. 12), or a torsion spring 303 (FIG. 13). Thus, the force assist device 146 may be any device which may lessen the force necessary to move the linkage system 104 from an open position (FIG. 4) to a closed position (FIG. 2) or from a closed position (FIG. 2) to an open position (FIG. 4).

Those of skill in the art will appreciate that the force assist arrangement 140 may be utilized to assist in the sliding movement between first and second portions 100, 102. That is, the first ends 148, 150 of the first and second links 142, 144 may be pivotably coupled together, the second end 152 of the first link 142 pivotably coupled to the first portion 100, the second end 154 of the second link 144 pivotably coupled to the second portion 102, and the assist device 146 pivotably coupled along the lengths of the first and second links 142, 144. The links 142, 144 may be unitary structures or may include a plurality of individual sections that may be coupled together to form the respective links 142, 144. The method may further include the step of coupling a slidable coupling 104 to the first and second portions 100, 102, and coupling the force assist arrangement 140 either directly or by way of the slidable coupling 104 to the first and second portions 100, 102.

The embodiments described herein are provided by way of example and for illustration purposes only. Therefore, the examples set forth herein should not be construed as limiting in any way the construction of the slidable coupling or the force assist arrangement to specific materials or specific arrangements.

INDUSTRIAL APPLICABILITY

Some embodiments of the disclosed force assist arrangement for a slidable coupling may be useful in a variety of assemblies using sliding panel arrangements, particularly where it is advantageous to reduce the amount of force exerted by an operator to move the sliding panel. Inasmuch as the force assist arrangement and/or the slidable coupling may be adapted to reduce the amount of space used by a coupling arrangement, it may provide enhanced fit between the slidably mounted portions and/or the materials adjacent the slidably mounted portions. This improved fit may reduce the pathways for air to enter or exit the area covered by such a panel in some embodiments.

Figure 7:
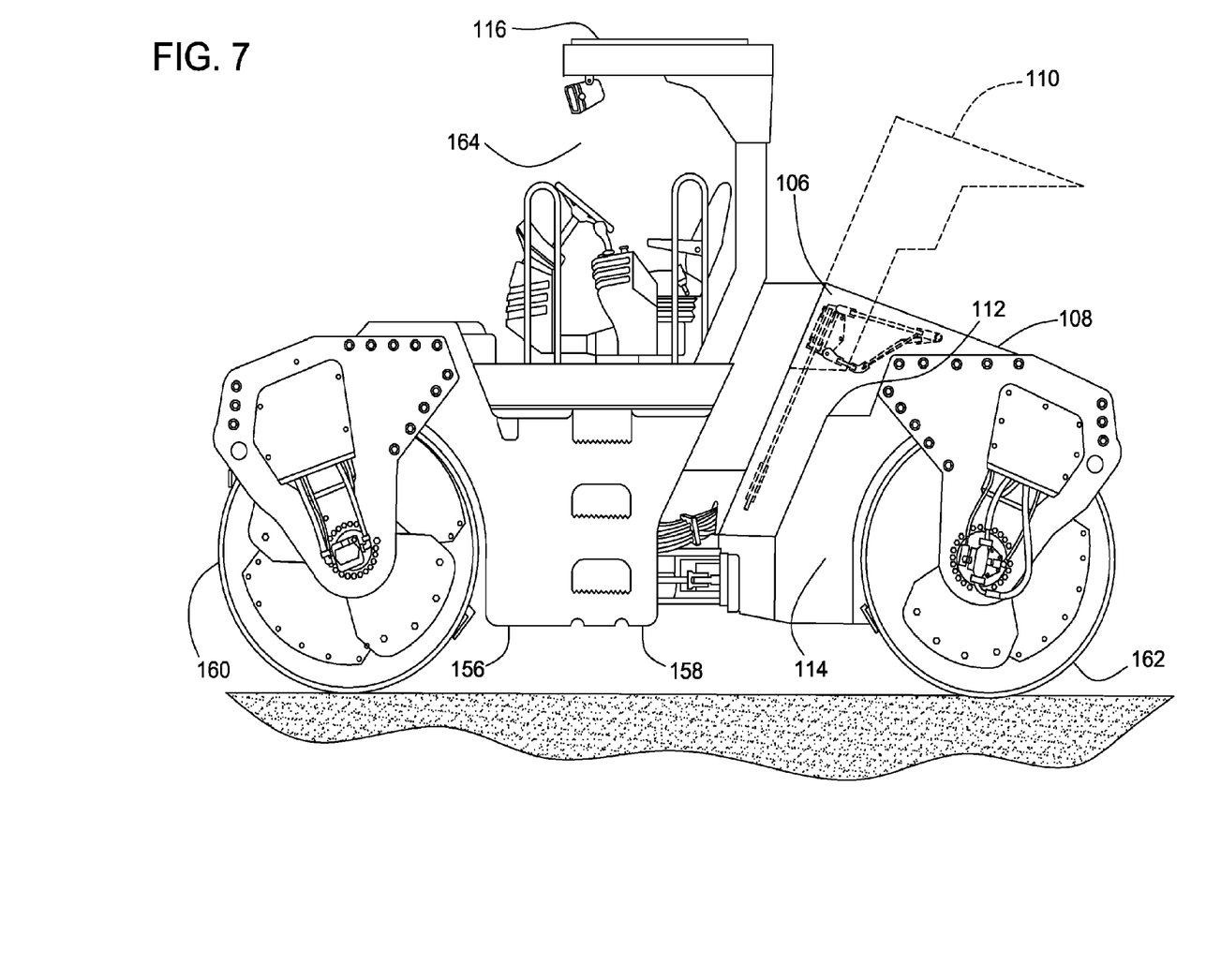
FIG. 7 is a side elevational view of an exemplary vehicle employing a slidable coupling and force assist arrangement of the disclosure, a moveable panel being shown in a closed position.
Figure 8:
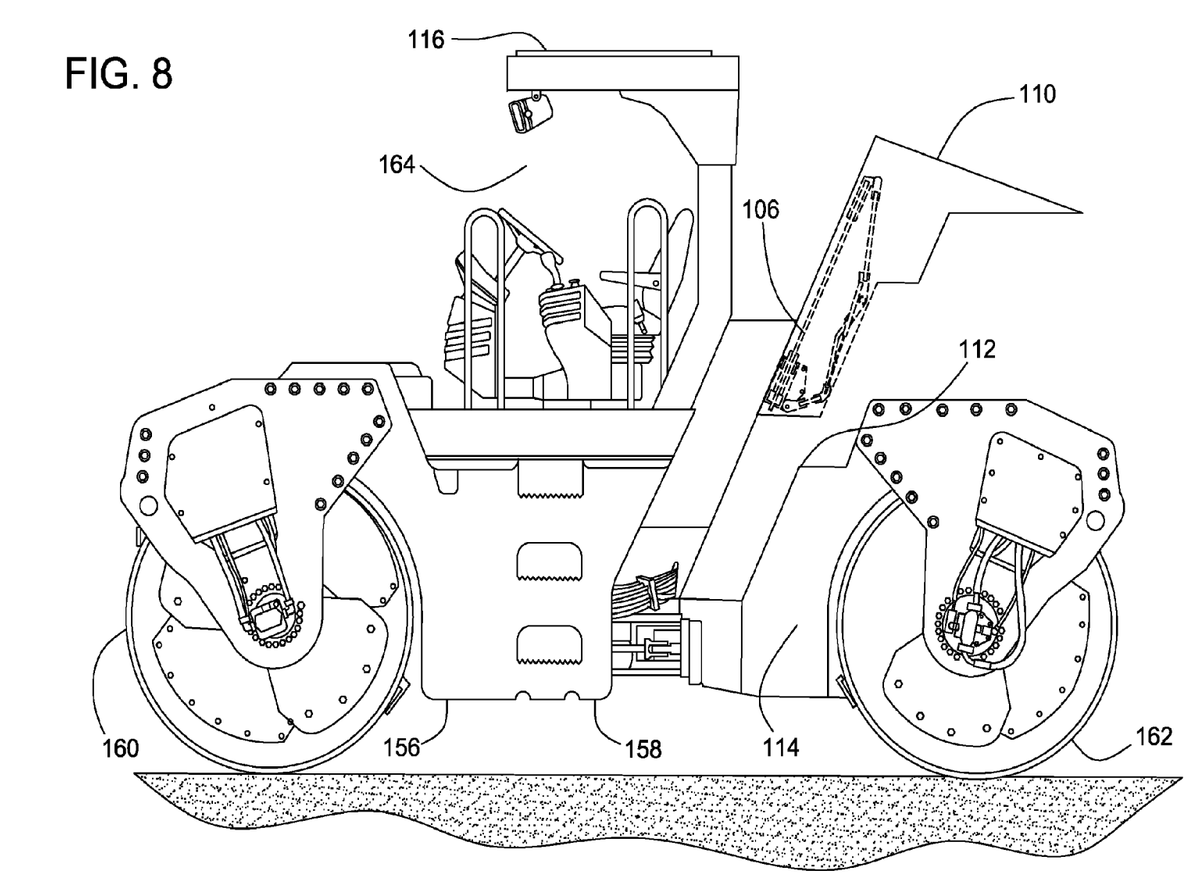
FIG. 8 is a side elevational view of an exemplary vehicle employing a slidable coupling and force assist arrangement of the disclosure, the moveable panel being shown in an open position.

The disclosed force assist arrangement may be particularly useful in a variety of machines, and motor vehicles, to provide more efficient operation by enhancing the fit of a movable panel to the vehicle body. Referring now to FIGS. 7-8, there is shown a vehicle 116 with a vehicle body 156 supported on a frame 158, the frame being supported on a plurality of motivators, in this case, a pair of rollers 160, 162. The vehicle body 156 includes a cab 164 for supporting an operator. The vehicle body 156 additionally forms a compartment, here, an engine compartment 114, and an opening 112 that allows access to the engine compartment 114.

To cover the opening, the vehicle body 156 includes a panel 106 in sliding communication with the remainder of the vehicle body 156, the panel 106 being supported on the body 156 by a slidable coupling such as, for example, the slidable coupling 104 of FIGS. 1-5. The panel 106 is selectively movable and may be disposed in a closed position 108 (FIG. 7), wherein the panel substantially covers the opening 112 and the engine compartment 114, and an open position 110 (FIG. 8), wherein the panel substantially does not cover the opening 112 or the engine compartment 114. While the illustrated compartment is an engine compartment 114, the compartment may be any type and in any location within the vehicle body 156.

In order to assist the operator in slidable movement of the panel, a force assist arrangement such as, for example, the force assist arrangement 140 of FIGS. 1-5 is provided. The force assist arrangement 140 may reduce the force necessary for an operator to move the panel 106 from the closed position 108 to the open position to 110. For example, the force assist arrangement 140 may reduce the force necessary for an operator to move the panel 106 from the closed position 108 to the open position 110 to thirty pounds of force or less. The force assist arrangement 140 may also slow creeping of the panel 108 from the open position 110 to the closed position 108.

Although a compactor is illustrated in FIG. 7, it is provided by way of example and for illustration purposes only. Therefore, this example should not be construed as limiting based on the specific vehicle described in association therewith, but should be construed as applicable to any other type of machine, vehicle or any arrangement which could include a panel covering an opening. Thus, the term "machine" may refer to any machine, including, but not limited to, vehicles, that includes such structure. Similarly, the term "vehicle" may refer to a mobile machine that includes such structure, including any vehicle that performs some type of operation associated with an industry known in the art. For example, a vehicle may be an earth-moving machine, such as a wheel loader, excavator, dump truck, backhoe, motor grader, material handler, soil compactor, asphalt compactor, paving machine or the like. Further, a vehicle may include motivators such as wheels, rollers, track systems or the like. The vehicle may also include an attached implement, which may be utilized and employed for a variety of tasks, including, for example, loading, compacting, lifting, brushing, breaking, and include for example, buckets, compactors, forked lifting devices, brushes, grapples, cutters, shears, blades, breakers/hammers, augers, and others.

In providing the operator a friendly sliding panel arrangement, minimal space may be consumed within the engine compartment 114. For example, in some embodiments, the force assist arrangement and/or the slidable coupling may be disposed substantially in respective planes or a single plane. In some embodiments, space efficiency offered by the force assist arrangement and/or the slidable coupling may allow for the overall size of the engine compartment to be reduced because the force assist arrangement may minimize the use of valuable engine compartment space. Thus, the arrangement may be particularly useful in vehicles where it is desirable to reduce or minimize the overall size of the engine compartment. Moreover, use of the arrangement may reduce the opportunity for warm air to flow out of the engine compartment 114 by reducing pathways for air to enter or exit the engine compartment when the panel 106 is in the closed position.

In some embodiments, this reduced engine compartment size may additionally allow for reduced size of the vehicle body. This reduction in body size may result in associated advantages, such as minimizing blind spots and viewing obstructions for the operator, enhancing the operator's view of the areas surrounding the machine.

Some embodiments include the force assist arrangement in combination with the slidable coupling. In such embodiments, the combined unit may be readily assembled to the first or second portion, possibly reducing labor and/or facility costs associated with assembly and/or replacement.

It will be appreciated that the foregoing description provides examples of the disclosed arrangements and methods. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A force assist arrangement including a slidable coupling coupled to a first portion and a second portion, the first and second portions being slidably coupled relative to one another and adapted to move between a closed position wherein the first and second portions are substantially adjacent one another and an open position wherein the slidable coupling telescopes to extend the second portion at least partially beyond and outwardly from the first portion, the force assist arrangement comprising an assist device and at least a first link and a second link, said first link and said second link each having a length and first and second ends, the links being pivotably coupled together at their first ends, the second end of the first link being adapted to be pivotably coupled to the first portion, the second end of the second link being adapted to be pivotably coupled to the second portion, and the assist device being pivotably coupled along the respective lengths of the first and second links between their respective pivotable first and second ends.

2. The force assist arrangement of claim 1 wherein the assist device includes at least one of a gas spring, a compression spring or a torsion spring.

3. The force assist arrangement of claim 1 wherein either of the links are substantially straight.

4. The force assist arrangement of claim 1 wherein either of the links are substantially not straight.

5. The force assist arrangement of claim 1 wherein either link is formed using separate pieces, said separate pieces being connected together.

6. The force assist arrangement of claim 1 wherein either link is formed using a single unitary piece.

7. The force assist arrangement of claim 1 wherein the slidable coupling includes at least one of a drawer slide, a telescoping slide arrangement, rollers, a plurality of linear bearings and a longitudinal member, the longitudinal member being sized and disposed to slide within the plurality of linear bearings, or a track and at least two supports, the supports being sized and disposed to move within the track.

8. The force assist arrangement of claim 1 wherein the first link, the second link, and the assist device are substantially disposed in a single plane and the assist device includes a gas spring.

9. An assembly for attachment to first and second portions to be mounted in a relatively slidable arrangement, the assembly comprising:
a slidable coupling adapted to be coupled to at least one of the first and second portions, the slidable coupling providing relative sliding movement between the first and second portions between a closed position wherein the first and second portions are substantially adjacent one another and an open position wherein the slidable coupling telescopes to extend the second portion at least partially beyond and outwardly from the first portion, and
a force assist arrangement, the force assist arrangement including an assist device and at least a first link and a second link, each link having a length and first and second ends, said links being pivotably coupled together at their first ends, the second end of the first link being pivotably coupled to the first portion, the second end of the second link being pivotably coupled to the second portion, and the assist device being pivotably coupled along the respective lengths of the first and second links between their respective pivotable first and second ends.

10. The assembly of claim 9 wherein the assist device includes at least one of a gas spring, a compression spring or a torsion spring.

11. The assembly of claim 9 further wherein the slidable coupling is adapted to be coupled to each of the first and second portions.

12. The assembly of claim 9 wherein the slidable coupling includes at least one of a drawer slide, a telescoping slide arrangement, rollers, a plurality of linear bearings and a longitudinal member, the longitudinal member being sized and disposed to slide within the-plurality of linear bearings, or a track and at least two supports, the supports being sized and disposed to move within the track.

13. An assembly comprising:
a body including an opening,
a panel complementary to the opening adapted to slide with respect to the body between a first position wherein the opening is at least partially uncovered by the panel and at least a portion of the panel extends outwardly from the body and a second position wherein the opening is at least partially covered by the panel,
a slidable coupling disposed between the body and the panel, the slidable coupling telescoping to provide relative sliding movement between the panel and the body, and
a force assist arrangement, the force assist arrangement including an assist device and at least a first link and a second link, each link having a length and first and second ends, said links being pivotably coupled together at their first ends, the second end of the first link being pivotably coupled to one of the body or the panel, the second end of the second link being pivotably coupled to the other of the body or the panel, and the assist device being pivotably coupled along the respective lengths of the first and second links between their respective pivotable first and second ends.

14. The assembly of claim 13 wherein the assembly is a machine.

15. The assembly of claim 13 wherein the assembly is a vehicle.

16. The assembly of claim 15 wherein the force assist device includes a gas spring, and the slidable coupling includes a longitudinal member sized and disposed to slide within two linear bearings.

17. The assembly of claim 13 wherein the force assist device includes at least one of gas spring, a compression spring or a torsion spring.

18. The assembly of claim 13 wherein the slidable coupling includes at least one of a drawer slide, a telescoping slide arrangement, rollers, a plurality of linear bearings and a longitudinal member, the longitudinal member being sized and disposed to slide within the-plurality of linear bearings, or a track and at least two supports, the supports being sized and disposed to move within the track.

19. The assembly of claim 13 wherein the force assist device is arranged such that the panel may be moved from the closed position to the open position by using less than thirty pounds of force.

* * * * *